United States Patent [19]
Kuwahara

[11] Patent Number: 5,944,149
[45] Date of Patent: Aug. 31, 1999

[54] PERMANENT MAGNET TYPE EDDY CURRENT BRAKING SYSTEM

[75] Inventor: Tohru Kuwahara, Kawasaki, Japan

[73] Assignee: Isuzu Motors Limited, Japan

[21] Appl. No.: 08/924,801

[22] Filed: Sep. 5, 1997

[30] Foreign Application Priority Data

Sep. 6, 1996 [JP] Japan ................................ 8-257521

[51] Int. Cl.⁶ .................................................. F16D 65/36
[52] U.S. Cl. ......................... 188/156; 188/164; 188/158; 188/267
[58] Field of Search ................................ 188/267, 164, 188/158, 161, 159, 162; 310/93, 105

[56] References Cited

U.S. PATENT DOCUMENTS 3,488,535   1/1970   Baermann ................................ 310/93
5,855,256   1/1999   Kuwahara ................................ 188/164

FOREIGN PATENT DOCUMENTS 2057610   7/1980   United Kingdom .................... 188/164

*Primary Examiner*—Robert J. Oberleitner
*Assistant Examiner*—Melanie Talavera
*Attorney, Agent, or Firm*—John E. Toupal; Harold G. Jarcho

[57] ABSTRACT

A guide tube formed from non-magnetic material defines a cavity of rectangular section arranged within a brake drum, and a plurality of ferromagnetic plates are retained at equal circumferential intervals by an outer portion of the guide tube. Magnet support tubes formed out of magnetic material and axially spaced and rotatably supported in the cavity of the guide tube and magnets twice in number of the ferromagnetic plates are mounted to outer surfaces of the magnet support tubes with pairs of the magnets having common and alternating polarities. The magnet support tubes are reciprocatively rotated by actuators to produce non-braking, braking and partial braking conditions.

16 Claims, 4 Drawing Sheets

PERMANENT MAGNET TYPE EDDY CURRENT BRAKING SYSTEM

BACKGROUND OF THE INVENTION

The present invention relates generally to a permanent magnet type eddy current braking system, and more specifically, to a permanent magnet type eddy current braking system capable of providing a partial braking condition.

In the permanent magnet type eddy current reduction apparatus disclosed in Japanese Patent Laid-Open No. Hei 4-88,867 and the like, a number of permanent magnets (hereinafter merely referred to as magnets) are juxtaposed on the outer peripheral surface of a single magnet support tube which is arranged interiorly of a rotating brake drum so that polarities are N, N, S, S, . . . in a circumferential direction, and a guide tube having a number of ferromagnetic plates (pole pieces) is arranged between the brake drum and the magnets. When a pair of magnets different in polarity are opposed to the inner surface of a common ferromagnetic plate by rotation of the magnetic support tube, a magnetic field from the magnets is interrupted inside the ferromagnetic plate and is not applied to the brake drum, producing a non-braking state. Conversely, when a pair of magnets having the same polarity are opposed to the inner surface of a common ferromagnetic plate, a magnetic field from the magnets passes through the ferromagnetic plate and is applied to the brake drum, producing a braking state in which an eddy current flows into the rotating brake drum. A partial braking force may be obtained by holding a magnetic support tube in an intermediate position between a braking position and a non-braking position by an air pressure actuator.

In the aforementioned apparatus, even if a diameter of the brake drum is not enlarged, an axial dimension can be lengthened whereby the braking force can be increased. It is therefore advantageous in the case where a mounting space of the eddy current reduction apparatus has allowable axial space. However, the axial dimension of the entire magnet support tube becomes longer and a great driving force is necessary for driving the entire magnet support tube to obtain the braking, partial braking and non-braking states. Therefore, the dimension and capacity of the air pressure actuator increases, the mounting property relative to the vehicle is poor, consumption of pressure air increases, and the number or dimension of magnets arranged on the magnet support tube is reduced.

The eddy current reduction apparatus disclosed in Japanese Patent Laid-Open No. Hei 4-12,659 addresses the aforementioned problems. However, diametrical space of the brake drum is limited, and if an attempt is made to lengthen the axial dimension of the magnets to secure a greater braking force, the ferromagnetic plate has to be increased in thickness in order to confine an axial short-circuiting magnetic circuit during a non-braking state and thereby prevent leakage of magnetism to the brake drum.

In view of the aforementioned problems, the object of the present invention is to provide an improved permanent magnet type eddy current braking system in which even with relatively thin ferromagnetic plates, leakage of magnetism during non-braking conditions is confined.

SUMMARY OF THE INVENTION

The present invention includes an immovable guide tube formed out of non-magnetic material and having an annular cavity of a rectangular section arranged interiorly of a brake drum, a number of ferromagnetic plates connected to an outer portion of the guide tube at equal intervals in a circumferential direction, and first and second axially spaced apart magnetic support tubes rotatably mounted in the annular cavity of the guide tube. Also included are a plurality of permanent magnets, twice in number of the ferromagnetic plates, and retained by outer surfaces of first and second support tubes such that circumferentially distributed pairs of the magnets opposed to said ferromagnetic plates have common polarities that alternate circumferentially; and actuators for separately rotating the first and second magnet support tubes by a half pitch of the ferromagnetic plates to provide a full braking condition in which polarities of pairs of the permanent magnets facing each ferromagnetic plate are the same, a non-braking condition in which polarities of pairs the permanent magnets facing each ferromagnetic plate are different from each other, and a partial braking condition in which polarities of pairs of the permanent magnets facing the plates from the first support tube are different from each other and polarities of pairs of magnets facing each plate from the second support tube are the same.

According to features of the present invention, each pair of magnets adjacent to each ferromagnetic plate has magnets different in polarity from each other to produce a non-braking condition. When the second magnet support tube is rotated by a half pitch of the ferromagnetic plates by the second actuator, it assumes a partial braking position in which three out of four magnets opposed to each ferromagnetic plate are the same polarity and one is a different polarity. Then, when the first magnet support tube is rotated by a half pitch of the ferromagnetic plates by the first actuator, four magnets opposed to each ferromagnetic plate are the same polarity to provide a full braking position.

According to another feature of the invention, the first magnet support tube can be reversely rotated from the braking position by the first actuator to return to the non-braking position, and the second magnet support tube can be reversely rotated by the second actuator to return to the non-braking position.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
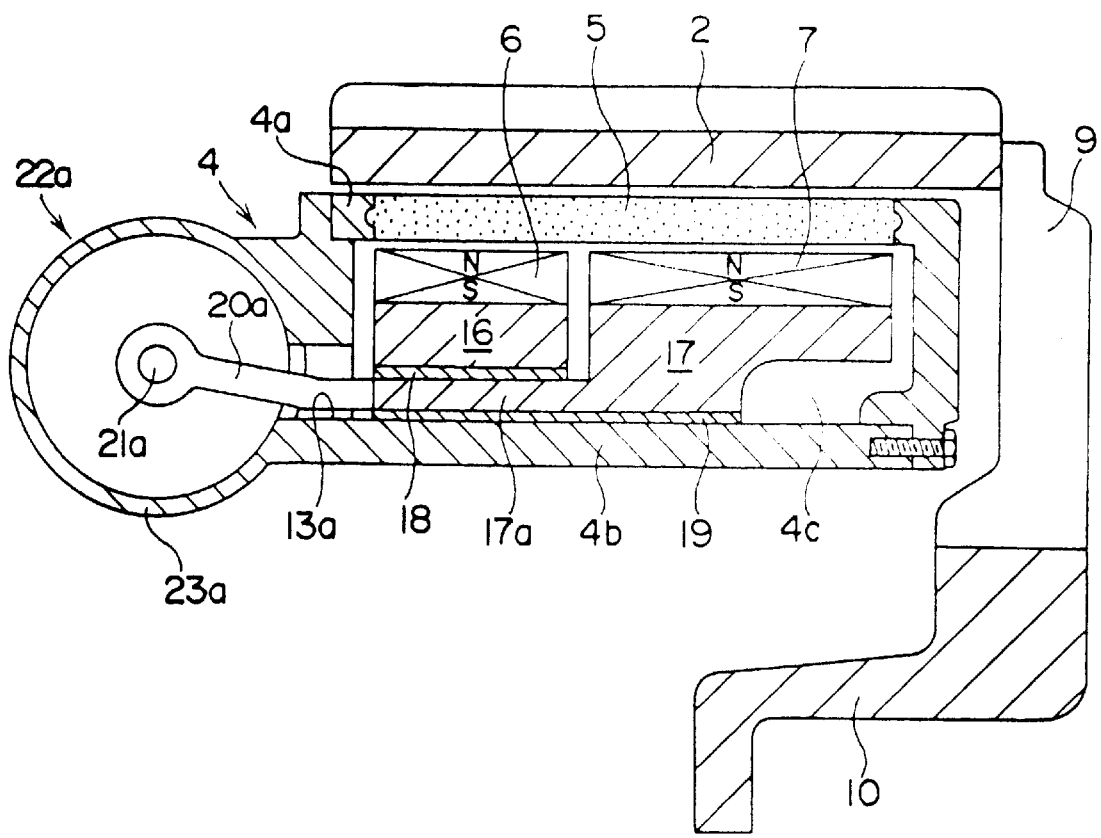
FIG. 1 is an elevational sectional view of a permanent magnet type eddy current braking system according to the invention.

As shown in FIG. 1, a permanent magnet type eddy current braking system includes a brake drum 2 formed out of a magnetic material and connected to a rotational shaft (not shown), for example, an output shaft of a vehicle transmission. A stationary guide tube 4 defines an annular cavity 4c of a rectangular section and arranged interiorly of the brake drum 2. Rotatably mounted within the cavity 4c are first and second magnetic, support tubes 16 and 17. The tubes 16 and 17 are axially spaced apart and have, respectively, outer surfaces facing first and second circumferentially extending first and second portions of an inner surface of the brake drum 2. One end of the brake drum 2 is open (left end in FIG. 1) and its opposite base end is connected to a number of spokes 9 extending radially from a boss portion 10 connected to the rotational shaft (not shown).

The guide tube 4 is formed out of a non-magnetic body or non-magnetic material and has end walls connected to inner and outer tube portions 4a, 4b by a plurality of bolts. A plurality of ferromagnetic plates (pole pieces) 5 are returned by the outer tube portion 4b at circumferentially spaced apart equal intervals having a pitch p. Supported by an outer surface of the first support 16 are a plurality of circumferentially distributed first permanent magnets 6 including a pair disposed radially adjacent to each of the ferromagnetic plates 5. Similarly supported by an outer surface of the second support 17 are a plurality of circumferentially distributed second permanent magnets 7 including a pair disposed radially adjacent to each of the ferromagnetic plates 5. Each pair of the permanent magnets 6 and 7 facing a ferromagnetic plate 5 has a common polarity opposite to the polarity of circumferentially adjacent pairs of the magnets 6,7. Preferably, a predetermined gap p2 (FIG. 5) between the pairs of magnets 6 of common polarity is greater than a given gap p1 between the magnets 6 of different polarities. Similarly, a predetermined gap p2 between the pairs of magnets 7 of common polarity is greater than a given gap p1 between the magnets 7 of different polarities.

In the illustrated embodiment, the magnet support tube 17 is provided with a thin cylindrical portion 17a integral therewith and rotatably supported on the inner tube portion 4a of the guide tube 4 by a bushing 19, and the magnet support tube 16 is rotatably supported on the thin cylindrical portion 17a by a bushing 18. The magnet support tubes 16 and 17 have substantially the same construction except that the magnet support tube 17 is longer in axial dimension than the magnet support tube 16. Also, the magnets 6 have a given axial length while the magnets 7 have an axial length greater than the given axial length of the magnets 6.

When the brake torque in the partial braking position of the magnet support tubes 16 and 17 is ½ of the brake torque in the full braking position, the rate in axial dimension between the magnet support tubes 16 and 17 and the magnets 6 and 7 is approximately 4:6. More specifically, since the brake torque of the magnet support tubes 16 and 17 is proportional to 1.3 to 1.5 square of the axial dimension, the rate of axial dimension between the magnets 6 and 7 will suffice to be approximately 42:58 to 37:63.

The magnet support tube 17 is disposed in the inner deep portion (right end side) of the brake drum 2 and the magnet support tube 16 is disposed in the open end portion (left end side) of the brake drum 2 for the following reasons. The magnet support tube 17 is rotated and switched to generate a partial braking torque because the temperature distribution of the brake drum 2 during the partial braking condition is more uniform. Conversely, when eddy currents are generated near the open end of the brake drum 2, heat distribution is concentrated at the open end so that the temperature distribution is uneven and the brake drum 2 tends to be thermally deformed. When eddy currents are generated at the inner deep portion of the brake drum 2, heat is dissipated by the spokes 9 and heat distribution of the brake drum 2 tends to be uniform.

According to the invention, the first and second magnet support tubes 16 and 17 are independently either commonly or reversely rotated by the first and second actuators 22 and 22a to provide one-half pitch (p/2) movement of the magnets 6, 7 relative to the ferromagnetic plates 5. In response thereto, there is produced a non-braking condition in which polarities of two magnets 6, 7 adjacent to each ferromagnetic plates 5 are different from each other, a full braking condition in which polarities of magnets 6 and 7 adjacent to each ferromagnetic plate 5 are the same, and a partial braking condition in which polarities of two magnets 6 adjacent to the ferromagnetic plates 5 are different from each other and polarities of two adjacent magnets 7 are the same.

As shown in FIG. 1, an arm 20a projecting from the thin cylindrical portion 17a of the second magnet support tube 17 projects through a slot 13a in the end wall of the guide tube 4 and is connected (FIG. 2) to a rod 21a of the second actuator 22a. Similarly, an arm 20 projecting from the first magnet support tube 16 projects through a slot in the end wall of the guide tube 4 and is connected to a rod 21 of the first actuator 22. The first actuator 22 has a piston 24 fitted in a cylinder 23, and the rod 21 extends from the piston 24 and is connected to the end wall of the first magnet support tube 16 by the arm 20. Similarly, the second actuator 22a has a piston 24a fitted in a cylinder 23a, and the rod 21a extends from the piston 24a and is connected to the end wall of the second magnet support tube 17 by the arm 20a. Alternatively, the magnet support tubes 16 and 17 can be separately rotatably supported directly on the inner tube portion 4b by bushings, and the arm 20a can project through a slot in the magnet support tube 16 and the slot 13a in the end wall of the guide tube 4.

Figure 2:
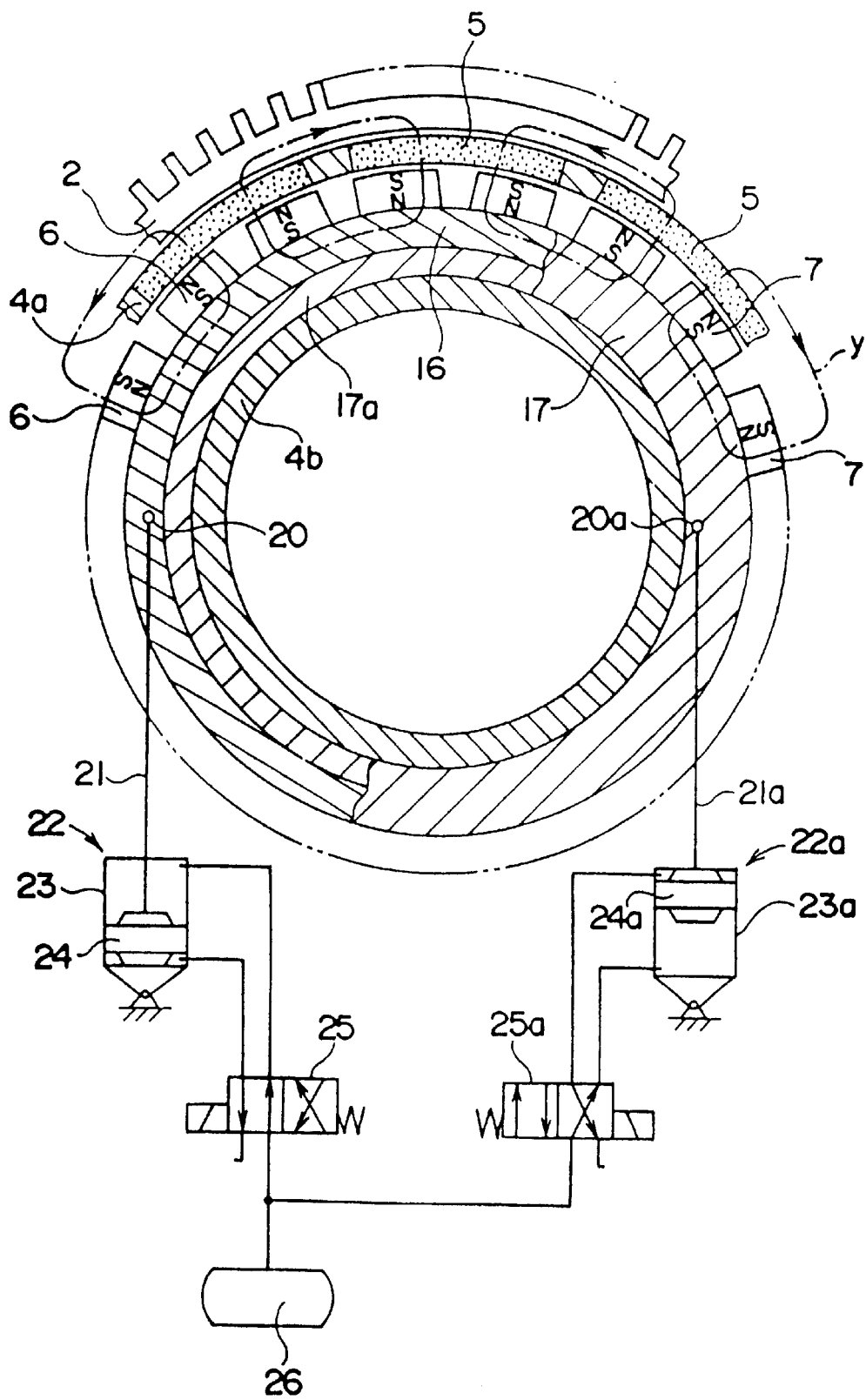
FIG. 2 is a left side sectional view of the system shown in a braking condition.
Figure 3:
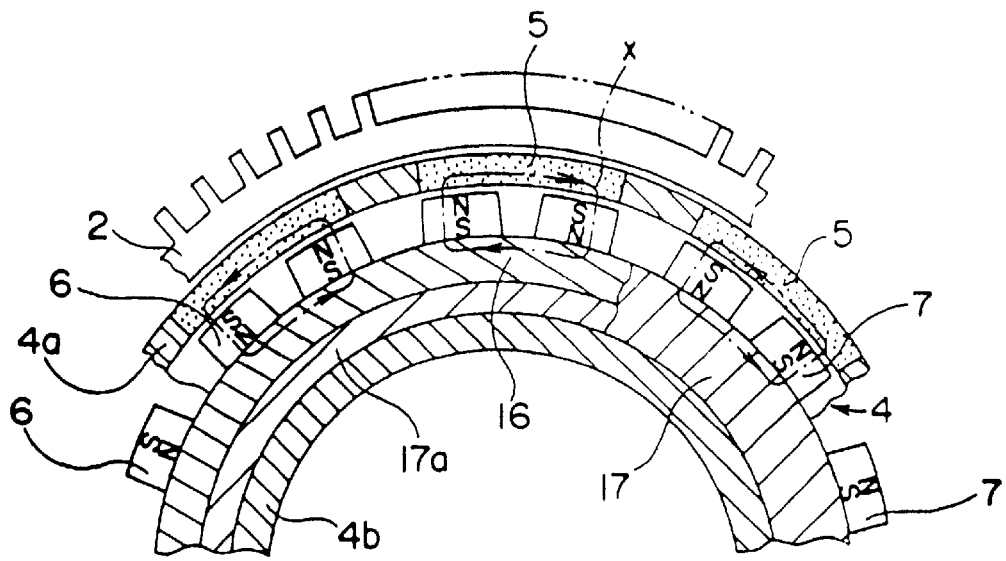
FIG. 3 is a left side sectional view of the system shown in a non-braking condition.

Next, the operation of the permanent magnet type eddy current braking system according to the present invention will be explained. In a non-braking condition shown in FIGS. 3 and 4, electromagnetic switching valves 25, 25a (FIG. 2) are deenergized, and pressure air from an air tank 26 is supplied to a lower end chamber of the actuator 22 via an electromagnetic switching valve 25, and an upper end chamber is opened to the atmosphere thereby. Similarly, pressure air from the air tank 26 is supplied to an upper end chamber of the actuator 22a via the electromagnetic switching valve 25a, and a lower end chamber is opened to the atmosphere thereby. In the non-braking condition shown in FIG. 4, the pairs of both magnets 6 and 7 opposed to each ferromagnetic plate 5 are in non-braking positions with polarities of each pair being different from each other. Accordingly, as shown in FIG. 3, short-circuiting magnetic circuits x are formed between the ferromagnetic plates 5 and the magnet support tubes 16 and 17 in a plane perpendicular to the center axis of the brake drum 2. Thus, the magnets 6 and 7 do not apply a magnetic field to the brake drum 2.

The magnet support tube 17 is rotated from the non-braking position shown in FIG. 4 to the braking position shown in FIG. 5 in the following manner. When the electromagnetic switching valve 25a is excited, pressure air is supplied to the lower end chamber of the actuator 22a. The magnet support tube 17 is rotated a half pitch p/2 of the ferromagnetic plates 5 in a direction indicated by arrow z1 of FIG. 4 while the support tube 16 remains in the non-braking position. At this time, the polarity of one magnet 6 opposed to the ferromagnetic plate 5 is the same as the polarities of the two opposed magnets 7, and the polarity of the other opposed magnet 6 is different from the others. In this partial braking position, magnetic flux arriving at the inner surface of the brake drum 2 from the magnets 6 and 7 via the ferromagnetic plates 5 is about half of that in a full braking position.

The magnet support tube 16 is rotated from the non-braking position shown in FIG. 5 to a braking position shown in FIGS. 2 and 6 in the following manner. When the electromagnetic switching valve 25 is excited, pressure air is supplied to the upper end chamber of the actuator 22, and the magnet support tube 16 is rotated a half pitch p/2 of the ferromagnetic plates 5 in a direction indicated by arrow z2 in FIG. 5. Polarities of all the magnets 6 and 7 opposed to each ferromagnetic plate 5 then are the same and all the magnets 6 and 7 apply a magnetic field to the inner surface of the brake drum 2 via the ferromagnetic plates 5 to produce a full braking condition with increased maximum brake torque. At this time, as shown in FIG. 2, magnetic circuits y are formed between the brake drum 2 and the magnet support tubes 16 and 17 in a plane perpendicular to the center axis of the brake drum 2.

Figure 5:
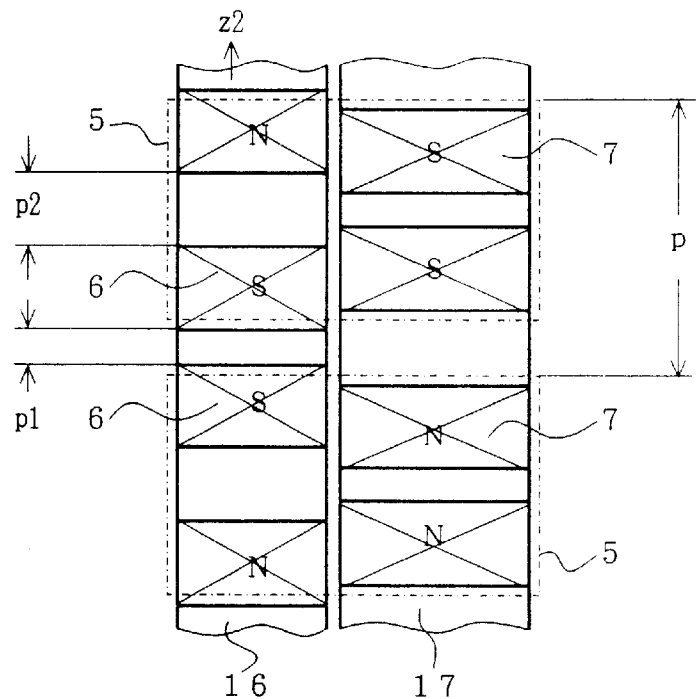
FIG. 5 is a developed plan view showing a partial braking condition of the system.
Figure 6:
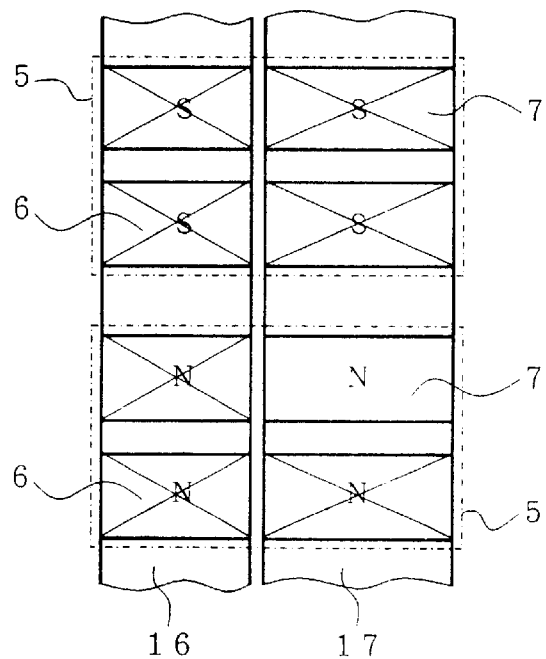
FIG. 6 is a developed plan view showing a full braking condition for the eddy current braking system.

Next, switching from the full braking condition shown in FIG. 6 to the partial braking condition shown in FIG. 5 is carried out in the following manner. When the electromagnetic switching valve 25 is deenergized, pressure air is supplied to the lower end chamber of the actuator 22, and the magnet support tube 16 is returned to the non-braking position shown in FIG. 5 while the support tube 17 remains in its braking position.

Figure 4:
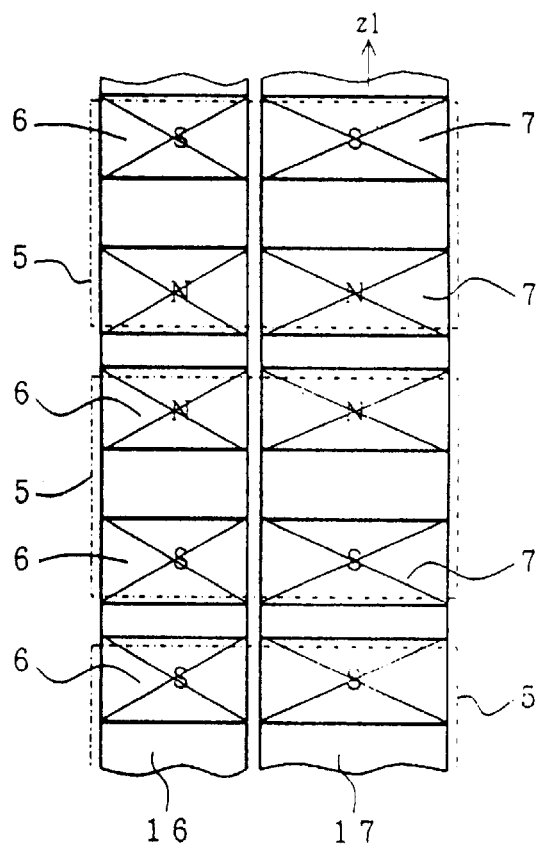
FIG. 4 is a developed plan view showing a non-braking condition of the system.

Switching from the partial braking condition shown in FIG. 5 to the non-braking condition shown in FIG. 4 is carried out in the following manner. When the electromagnetic switching valve 25a also is deenergized, pressure air is supplied to the upper end chamber of the actuator 22a, and the magnet support tube 17 is returned to the non-braking position shown in FIGS. 3 and 4. Because of the first and second fluid actuators 22 and 22a, a spring for returning to a non-braking condition is not required. Therefore, it is possible to shorten the overall length of the actuator and to reduce material and assembling cost.

While in the above-described embodiments, pressure air is supplied to the upper and lower end chambers of the actuators 22 and 22a or is discharged from the upper and lower end chambers, it is to be noted that a return spring can be provided in one end chamber and pressure air supplied to the other end chamber or discharged from the other end chamber to thereby reciprocate the actuators.

According to the present invention, even if the ferromagnetic plates 15 are made relatively thin, leakage of magnetism at the time of non-braking is confined, and sufficient braking force can be secured by a small actuator. Also, the stroke or the full length of the actuators is shortened, the weight can be reduced, and the quantity of pressure fluid consumed for driving the actuators can be minimized. Pressure fluid is merely selectively supplied to the end chambers of the actuators 22 and 22a by the two electromagnetic switching valves 25 and 25a to rotate the magnet support tubes 16, 17 stepwise from the non-braking positions to the braking positions. Therefore, if, for example, the partial braking condition is successively effected during movement on a long downward slope, brake overheating can be avoided.

Obviously, many modifications and variations of the present invention are possible in light of the above teachings. It is to be understood, therefore, that the invention can be practiced otherwise than as specifically described.

What is claimed is:

1. A permanent magnet type eddy current braking system comprising:

an annular brake drum having an open end and an opposite end connected to a rotational shaft; said drum having an inner surface extending between said open end and said opposite end;

a stationary, non-magnetic guide tube having inner and outer portions defining an annular cavity; said outer portion retaining a plurality of ferromagnetic plates adjacent to said drum and circumferentially spaced apart at a uniform pitch p;

an annular, magnetic first support rotatably mounted in said annular cavity and having an outer surface facing a circumferentially extending first portion of said inner surface;

an annular magnetic second support rotatably mounted in said annular cavity and axially spaced from said first support, said second support having an outer surface facing a circumferentially extending second portion of said inner surface;

a plurality of circumferentially distributed first permanent magnets supported by said outer surface of said first support and comprising a pair of said permanent magnets disposed radially adjacent to each of said ferromagnetic plates, each said pair of said first permanent magnets facing a said ferromagnetic plate has a common polarity opposite to the polarity of circumferentially adjacent said pairs;

a plurality of circumferentially distributed second permanent magnets supported by said outer surface of said second support and comprising a pair of said permanent magnets disposed radially adjacent to each of said ferromagnetic plates, each said pair of said second permanent magnets facing a said ferromagnetic plate has a common polarity opposite to the polarity of circumferentially adjacent said pairs;

a first actuator for producing rotational movement of said first support; and a second actuator for producing rotational movement of said second support.

2. A system according to claim 1 wherein said first actuator produces rotational movement of said first support between a non-braking position in which a pair of said first permanent magnets of common polarity face each said ferromagnetic plate and a braking position in which a pair of said first permanent magnets of opposite polarity face each said ferromagnetic plate, and said second actuator produces rotational movement of said second support between a non-braking position in which a pair of said second permanent magnets of common polarity face each said ferromagnetic plate and a braking position in which a pair of said second permanent magnets of opposite polarity face each said ferromagnetic plate.

3. A system according to claim 2 wherein said system is adapted to produce alternatively a non-braking condition in which said first support and said second support each are in said non-braking position, a full braking condition in which said first support and said second support each are in said braking position, and an intermediate braking condition in which said first support is in said non-braking position and said second support is in said braking position.

4. A system according to claim 3 wherein each of said first permanent magnets has a given axial length, and each of said second permanent magnets has an axial length greater than said given axial length.

5. A system according to claim 4 wherein said first portion of said inner surface is adjacent to said open end, and said second portion of said inner surface is adjacent to said opposite end.

6. A system according to claim 5 wherein said opposite end is connected to the shaft by a plurality of radially projecting spokes.

7. A system according to claim 6 wherein each pair of adjacent said first permanent magnets of common polarity are circumferentially separated by a gap of given circumferential length and each pair of adjacent said first permanent magnets of opposite polarity are circumferentially separated by a gap of predetermined length greater than said given circumferential length; and each pair of adjacent said second permanent magnets of common polarity are circumferentially separated by a gap of said given circumferential length and each pair of adjacent said second permanent magnets of opposite polarity are circumferentially separated by a gap of said predetermined length.

8. A system according to claim 7 wherein each of said first and second actuators is a fluid actuator coupled to, respectively, said first and second supports by connector members projecting through said open end of said brake drum, each of said first and second fluid actuators being adapted to provide alternate opposite directions of rotation of, respectively, said first and second supports.

9. A system according to claim 1 wherein each of said first permanent magnets has a given axial length, and each of said second permanent magnets has an axial length greater than said given axial length.

10. A system according to claim 9 wherein said first portion of said inner surface is adjacent to said open end, and said second portion of said inner surface is adjacent to said opposite end.

11. A system according to claim 10 wherein said opposite end is connected to the shaft by a plurality of radially projecting spokes.

12. A system according to claim 11 wherein each pair of adjacent said first permanent magnets of common polarity are circumferentially separated by a gap of given circumferential length and each pair of adjacent said first permanent magnets of opposite polarity are circumferentially separated by a gap of predetermined length greater than said given circumferential length; and each pair of adjacent said second permanent magnets of common polarity are circumferentially separated by a gap of said given circumferential length and each pair of adjacent said second permanent magnets of opposite polarity are circumferentially separated by a gap of said predetermined length.

13. A system according to claim 12 wherein each of said first and second actuators is a fluid actuator coupled to, respectively, said first and second supports by connector members projecting through said open end of said brake drum, each of said first and second fluid actuators being adapted to provide alternate opposite directions of rotation of, respectively, said first and second supports.

14. A system according to claim 1 wherein each pair of adjacent said first permanent magnets of common polarity are circumferentially separated by a gap of given circumferential length and each pair of adjacent said first permanent magnets of opposite polarity are circumferentially separated by a gap of predetermined length greater than said given circumferential length; and each pair of adjacent said second permanent magnets of common polarity are circumferentially separated by a gap of said given circumferential length and each pair of adjacent said second permanent magnets of opposite polarity are circumferentially separated by a gap of said predetermined length.

15. A system according to claim 14 wherein each of said first and second actuators is a fluid actuator coupled to, respectively, said first and second supports by connector members projecting through said open end of said brake drum, each of said first and second fluid actuators being adapted to provide alternate opposite directions of rotation of, respectively, said first and second supports.

16. A system according to claim 1 wherein each of said first and second actuators is a fluid actuator coupled to, respectively, said first and second supports by connector members projecting through said open end of said brake drum, each of said first and second fluid actuators being adapted to provide alternate opposite directions of rotation of, respectively, said first and second supports.

* * * * *